United States Patent [19]

Wagai et al.

[11] Patent Number: 5,177,478
[45] Date of Patent: Jan. 5, 1993

[54] PAGING SYSTEM HAVING AN EFFECTIVE ID-CODE TRANSFERRING FUNCTION

[75] Inventors: Kiyoshi Wagai, Hino; Tatsuaki Sekigawa, Hachioji; Shihoko Ohyanagi, Kokubunji; Mitsuji Shiono, Oome, all of Japan

[73] Assignee: Kabushiki Kaisha Toshiba, Kawasaki, Japan

[21] Appl. No.: 826,662

[22] Filed: Jan. 29, 1992

Related U.S. Application Data

[60] Division of Ser. No. 643,103, Jan. 22, 1991, abandoned, which is a continuation of Ser. No. 370,754, Jun. 23, 1989, abandoned.

[30] Foreign Application Priority Data

Jun. 24, 1988 [JP] Japan ................. 63-156537
Oct. 28, 1988 [JP] Japan ................. 63-272035

[51] Int. Cl.⁵ .................................. H04Q 7/00
[52] U.S. Cl. .................. 340/825.44; 340/311.1; 340/825.69; 340/825.72
[58] Field of Search ........... 340/825.44, 311.1, 825.5, 340/825.15, 825.22, 531, 825.47, 825.48, 825.54, 825.69, 825.72

[56] References Cited

U.S. PATENT DOCUMENTS

| | | | |
|---|---|---|---|
| 4,422,071 | 12/1983 | de Graaf | 340/825.15 |
| 4,750,118 | 6/1988 | Heitschel et al. | 340/825.69 |
| 4,771,399 | 9/1988 | Snowden et al. | 455/186 |
| 4,772,876 | 9/1988 | Land | 340/531 |
| 4,837,568 | 6/1989 | Snaper | 340/825.54 |
| 4,849,750 | 7/1989 | Andros et al. | 340/825.48 |
| 5,070,329 | 12/1991 | Jasinaki | 340/825.44 |

FOREIGN PATENT DOCUMENTS

2068616 8/1981 United Kingdom.

Primary Examiner—Donald J. Yusko
Assistant Examiner—Peter Steven Weissman
Attorney, Agent, or Firm—Oblon, Spivak, McClelland, Maier & Neustadt

[57] ABSTRACT

A paging apparatus comprises a control device for controlling all other components of the apparatus. The control device can have a memory for storing the ID number of the paging apparatus. There is shown methods and devices for storing the ID number in the memory or an ID memory device. These methods can be classified into two types. One type is write, into the memory of the control device or into the ID memory device, the ID number which the apparatus detects after a specific code and which has been broadcast from a base station, along with the specific code. The other type is to write the ID number into the memory of the control device or into the ID memory device when the input terminal provided the paging apparatus is connected to an external ID number writer. In either type of method, the paging apparatus generates an alarm upon completion of writing the ID number into the memory of the control device or into the ID memory device, thereby informing the user of this fact.

5 Claims, 11 Drawing Sheets

PAGING SYSTEM HAVING AN EFFECTIVE ID-CODE TRANSFERRING FUNCTION

This application is a division of application Ser. No. 07/643,103, filed on Jan. 22, 1991, now abandoned, which is a continuation of Ser. No. 07/370,754, filed Jun. 23, 1989, also abandoned.

BACKGROUND OF THE INVENTION

1. Field of the Invention

This invention relates to a radio paging system in which paging signals are broadcast from a base station to a plurality of pagers by way of radio channels and, more particularly, to a paging system in which the identification number (ID) codes of pagers are effectively transferred.

This invention further relates to a radio system such as a paging system, a cellular radio system, or a cordless telephone system wherein a base unit addresses a particular radio mobile unit by transmitting an identification signal which is identical to an identification code stored in a memory unit of the radio mobile unit and more specifically to a method of rewriting the identification code stored in said memory unit.

2. Description of the Related Art

Hitherto used as a communication system is a radio paging system comprising a base station, paging exchanger, and pagers. In this system, a request for any desired one of the pagers is sent from a telephone line to the base station through the paging exchanger. Upon receipt of the paging request, the base station forms a paging signal containing the identification number (ID) code of the desired pager. The base station broadcasts the paging signal at the time assigned to the group of pagers, including the desired pager.

Figure 1:
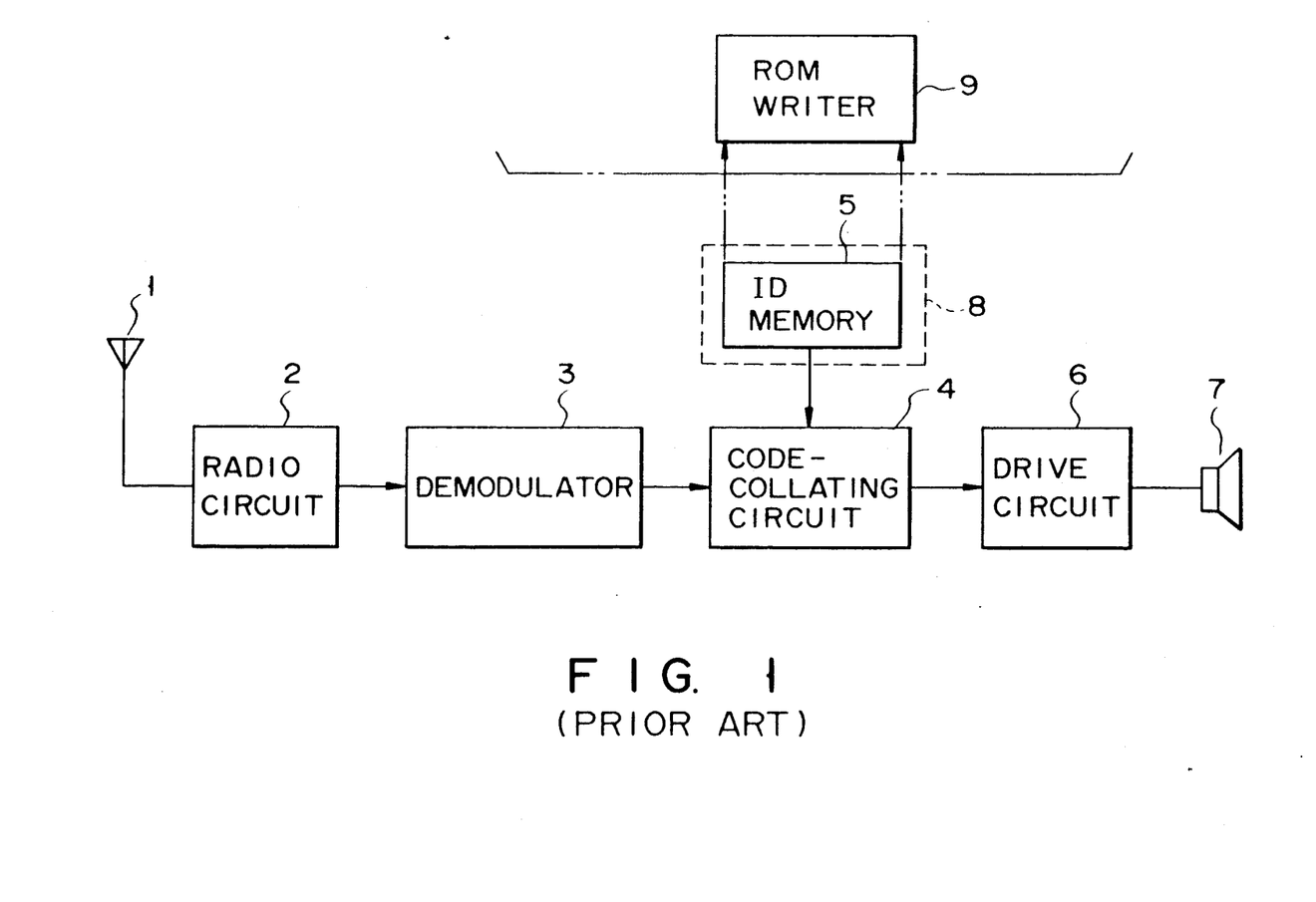
FIG. 1 is a block diagram showing a conventional pager.

FIG. 1 schematically illustrates a pager which can be used in the radio paging system. As is shown in this figure, the pager comprises antenna 1, a radio circuit 2, demodulation circuit 3, code-collating circuit 4, ID memory 5 such as a ROM, EPROM, EEPROM, drive circuit 6, speaker 7, and memory receptacle 8. In operation, antenna 1 catches a paging signal broadcast by the base station (not shown). Radio circuit 2 receives the paging signal from antenna 1. The paging signal is demodulated by circuit 3, and is then supplied to code-collating circuit 4. Circuit 4 collates the ID code inserted in the paging signal, with the ID code stored in ID memory 5 and representing the ID number of the pager after performing error correction operation. When the ID code inserted in the paging signal is identical to that stored in ID memory 5, circuit 4 supplies an alarm signal to drive circuit 6. In response to the alarm signal, circuit 6 drives speaker 7. As a result, speaker 7 makes a beep sound, informing the user of the pager that he or she is being called.

Figure 2:
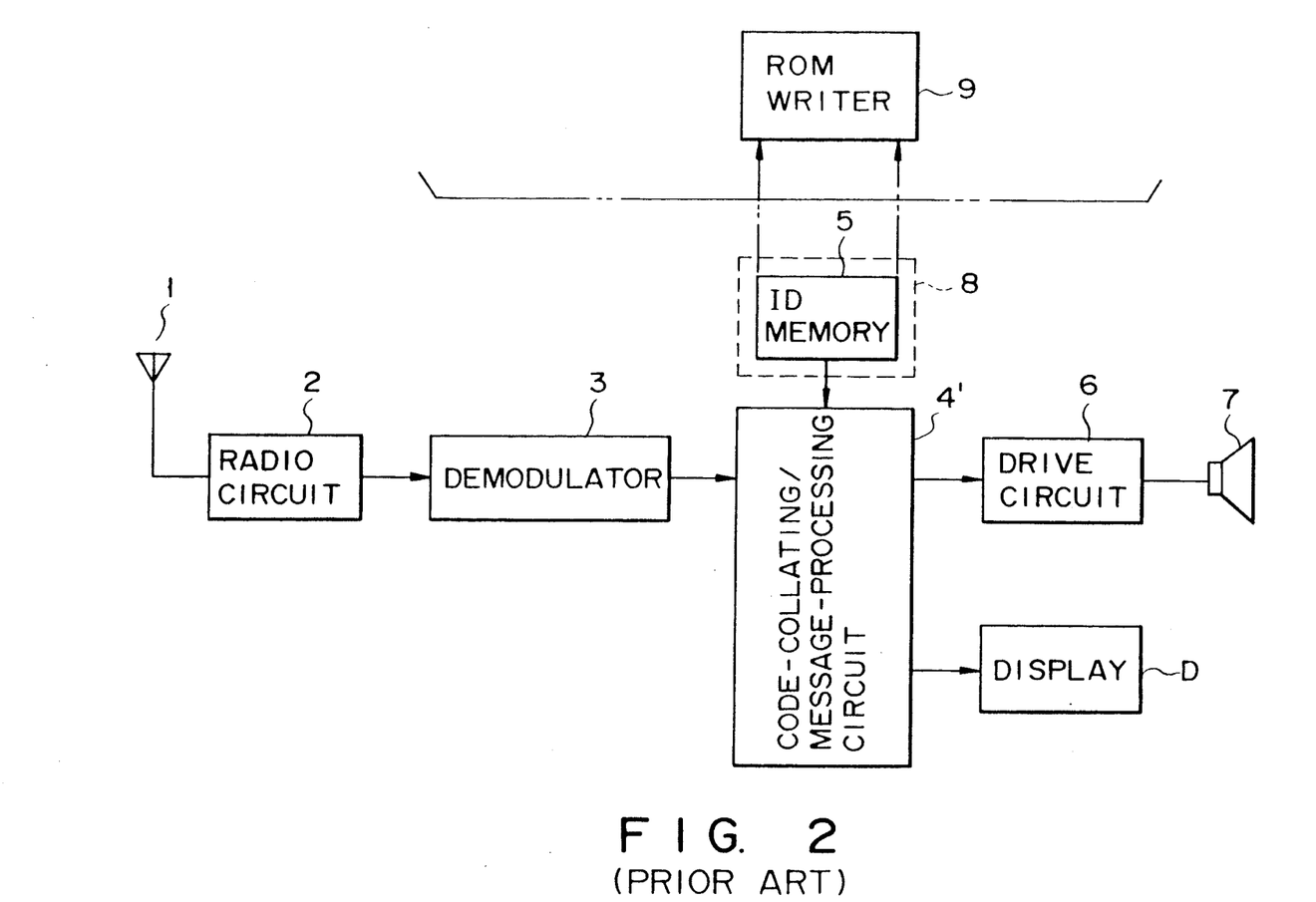
FIG. 2 is a block diagram illustrating another conventional pager.

FIG. 2 illustrates another pager which can be used in the radio paging system. This pager is different from the pager shown in FIG. 1 in two respects. First, code-collating/message-processing circuit 4' is used in place of code-collating circuit 4. Secondly, it further comprises a display D such as a liquid-crystal display. In operation, when circuit 4' determines that the pager is being requested, not only speaker 7 makes a beep sound, but also the display D displays the message, such as the caller's name and telephone number, which has been obtained by decoding the message code inserted in the paging signal broadcast from the base station (not shown).

When the user uses the pager illustrated in FIG. 1, he can know that he is being called, upon hearing speaker 7 making a beep sound. When he uses the pager shown in FIG. 2, he can know who is calling and what is the caller's telephone number, upon seeing the message on the display D.

ID codes are assigned to either type of a pager, described above. The ID code must be altered in some cases, for instance when the pager changes hands. To facilitate the alteration of the ID code, ID memory 5 can be detached from the memory receptacle 8. When it is necessary to alter the ID code, ID memory 5 is removed from receptacle 8. The ID code is altered, either by inserting another ID memory storing the new ID code, into memory receptacle 8, or by inserting the ID memory 5 back into receptacle 8 after the ID code has been rewritten by means of external ROM writer 9.

Obviously, the ID memory 5 must be a detachable DIP-type package which includes a relatively large ROM and is thus a relatively large, and the memory receptacle 8 for accommodating ID memory 5 inevitably occupies a large space. This is greatly detrimental to miniaturization of the pager and reduction in the number of components. The pagers shown in FIGS. 1 and 2 are inevitably large.

In order to alter the ID code, the user must open the case (not shown) of either pager described above, must draw ID memory 5 from receptacle 8, and must insert ID memory 5 or a new ID memory into receptacle 8. It takes him rather much time to open the case, draw memory 5 from receptacle 8, and insert memory 5 or a new ID memory into the receptacle.

SUMMARY OF THE INVENTION

It is, therefore, an object of the present invention to provide a new and improved paging system having an effective ID-code transferring function.

It is a further object of the present invention to provide a new and improved paging apparatus which has a small ID memory, requires no receptacle for the ID memory since the ID memory need not be detached from the pager, and allows for the rewriting the ID code stored in the ID memory.

Another object of the invention is to provide a method of writing an ID code into the ID memory provided in a pager, in which the ID code stored in the ID memory is rewritten without detaching the ID memory from the pager, thereby facilitating the rewriting of the ID code and miniaturizing the paging apparatus.

It is a still further object of the present invention to provide an pager, wherein improvements are made for miniaturization and conserving battery, and the ID code of the pager can be easily transferred and stored in the pager.

According to one aspect of the present invention, a paging apparatus receives paging signals or specific code for transferring identification codes which are transmitted over at least a radio channel and detects the paging signals or the specific code. The apparatus alarms a user of the apparatus in response to a detection of a paging signal which includes an identification code identical to the identification code stored in the apparatus while storing an identification code received in association with a specific code into a memory of the apparatus in response to a detection of the specific code.

According to another aspect of the present invention, a paging apparatus has a reception circuit, a microprocessor, and indicators. The reception circuit receives signals transmitted over one or more radio channels. The microprocessor has built-in memory region therein, detects a specific code within the received signals, and stores an identification code received in association with the specific code into the memory region in response to a detection of the specific code. The microprocessor further detects an identification code which is identical to the stored identification code within the received signals and controls the indicators so as to provide an indication to a user in response to a detecting of the identification code.

According to another aspect of the present invention, a connection terminal capable of being connected to an outer writing apparatus is provided in a paging apparatus. When the connection terminal is connected to the outer writing apparatus, an identification code generated in the outer writing apparatus is transmitted and stored in the paging apparatus in response to an actuation of a switch provided at the paging apparatus.

Furthermore, according to another aspect of the respect invention, at least an indication may be provided to a user in response to a completion of the storage of identification code.

It is accordingly an object of the present invention to provide an improved radio mobile unit in which an identification code may be stored into the unit without detaching a memory for storing the identification code from the unit.

It is yet another object of the present invention to provide a method of rewriting an identification code of the radio mobile unit wherein an identification code of the unit may be effectively and easily rewritten.

It is still a further object of the present invention to provide a radio system wherein the rewriting of the identification code stored in the radio mobile unit may be remotely controlled.

In accordance with the present invention, in order to transfer an identification number to a paging apparatus, it is not unnecessary to uncover a cover of a paging apparatus and change an ID memory device which stores an identification code. Still, in accordance with the present invention, an identification code of a paging apparatus may be stored in memory regions built in a microprocessor device for controlling the paging apparatus. Therefore, the ID memory device may be eliminated, thereby contributing to miniaturization of the paging apparatus and conservation of electric power.

To achieve one or more of the above objects, as embodied and described herein, the radio mobile unit according to this invention is used in a radio system wherein a base station addresses the radio mobile unit by transmitting an identification signal which is identical to an identification code stored in the storage of the radio mobile unit and which comprises a receiver receiving radio frequency signals transmitted from the base station over a predetermined radio channel and providing receive signals. It further comprises a detector coupled to the receiver for detecting the identification signal and a specific signal sequence with a new identification signal following the identification signal out of the received signal, and storage control coupled to the detector for storing the new identification signal into the storage instead of the identification code which has been previously stored in the storage, when the detector detects the specific signal sequence with the new identification signal.

The radio mobile unit may comprise a controller for setting the radio mobile unit to an identification code writing mode and the storage controller stores the new identification signal in the storage instead of the identification code which has previously been stored in storage in the event that the radio mobile unit is set to the identification code writing mode. Still, the radio mobile unit may comprise indicator for indicating the storing of the new identification code in the event the new identification signal is stored in the storage.

According to yet another aspect of the current invention, in a radio system wherein a base unit addresses a radio mobile unit by transmitting over a predetermined radio channel an identification signal which is identical to the identification code stored in the radio mobile unit, a method of changing the contents of the storage in the radio mobile unit comprising the steps of (a) receiving signals transmitted from the base station over the predetermined radio channel and providing received signals; (b) detecting the identification signal followed by a specific code with a new identification signal out of the received signal; and (c) writing the new identification signal as new identification code into storage instead of the identification code which has been stored in the storage when the specific signal sequence with the new identification signal is detected.

Still according to yet another aspect of the current invention, a radio system wherein a radio link is established between at least a base station and one or more radio mobile units comprises a transmitted provided at the base station for transmitting radio frequency signals including an identification signal identifying a particular radio mobile unit and a specific signal sequence with a new identification signal for the particular radio mobile unit over the radio link, a receiver provided at the radio mobile unit for receiving radio frequency signals transmitted from the base station over the radio link and providing receive signals with a detector coupled to this receiver for detecting the identification signal and the specific signal sequence with the new identification signal following the identification signal out of the receive signals, a storage controller coupled to the detecting means for storing the new identification signal in storage instead of the identification code which has previously been stored in the storage when the detecting means detects the specific signal sequence wit the new identification signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Figure 3:
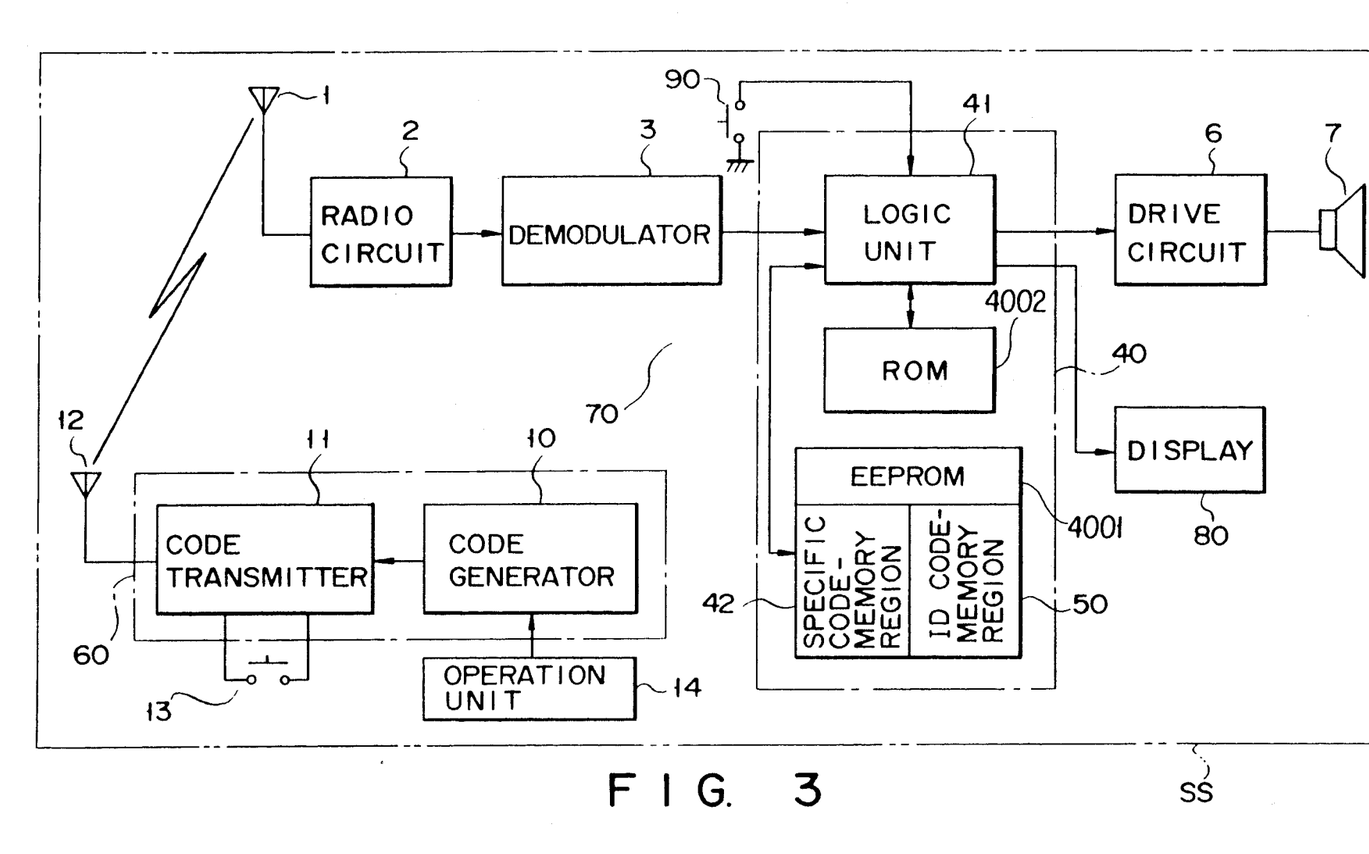
FIG. 3 is a block diagram showing a pager which is a first embodiment of the present invention, and also showing an ID code rewriter designed for use in combination with the pager.

FIG. 3 illustrates a pager 70 which is a first embodiment of the present invention, and also ID code writer 60 designed for use in combination with pager 70. Some of the components of pager 70 are identical to those shown in FIG. 1, and are thus designated by the same numerals in FIG. 3 and not described in detail.

As is shown in FIG. 3, ID code writer 60 comprises a code generator 10 and a code transmitter 11. The code generator 10 is, for example, a ROM writer. It outputs a specific code and a new ID code. The specific ID code is used to set a ID-code rewriting mode. The code transmitter has an antenna 12, and transmits the specific code and the new code in the form of such an ordinary paging signal as is transmitted by a base station.

Figure 5:
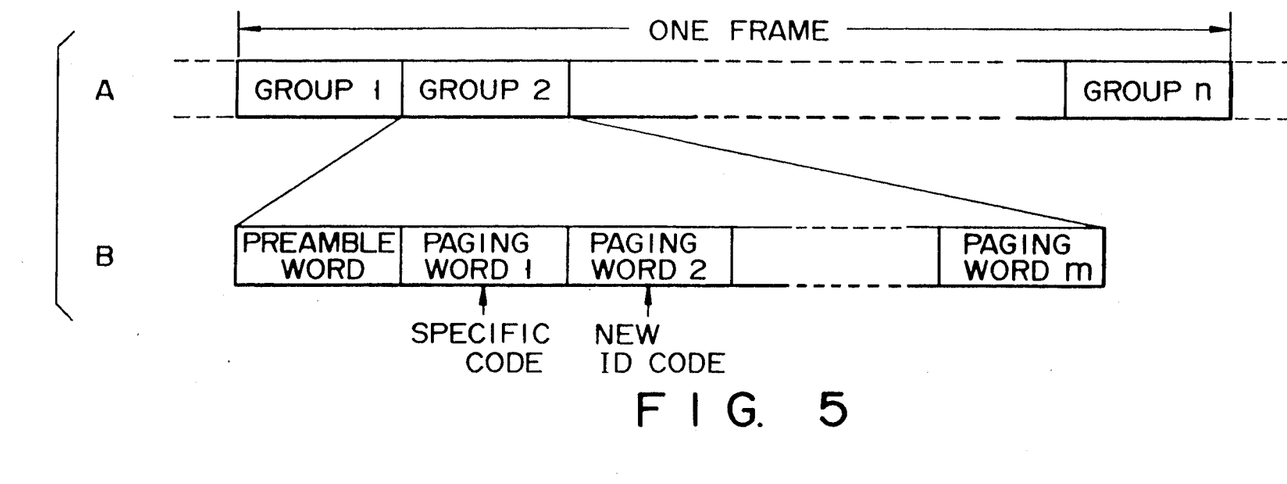
FIG. 5 is a diagram schematically representing a paging signal transmitted to the pager (FIG. 3), which contains a specific code and a new ID code.

The ordinary paging signal is schematically shown at A in FIG. 5. This signal consists of several zones, each zone formed of a plurality of frames. Each frame is time-divided into a plurality of groups, for example, n. Further, each of these groups is time-divided into m words, including a preamble word and several paging words. As is shown at B in FIG. 5, the ID code assigned to a desired pager is inserted in each of the paging words. The paging signal, so formed as is shown in FIG. 5 is transmitted from the base station.

Each paging word is a so-called BCH code which consists of i data bits and k check bits. In this embodiment, code transmitter 11 first inserts the specific code output by code generator 10, into any one of the words of the paging signal illustrated in FIG. 5, and a new ID code into the immediately following word of the paging signal, and then transmits the paging signal containing the specific code and the new ID code, though antenna 1. The new ID code will be used as a pager-writing signal.

The pager 70 comprises antenna 1, radio circuit 2, demodulator 3, control circuit 40, driver circuit 6, speaker 7, display 80, and mode-setting switch 90. Antenna 1 receives radio signals. Radio circuit 2 extracts paging signals of a predetermined frequency. Demodulator 3 synchronizes the paging signals. Control circuit 40 controls any other component of pager 70. Driver circuit 6 drives speaker 7 under the control of control circuit 40. Display 80 displays the received message, the received guide message, or the like, under the control of control circuit 40. Switch 90 sets the pager 70 to ID-code writing mode when turned on. Control circuit 40 comprises a microprocessor which has logic unit 41, EEPROM (Electrically Erasable Programmable Read Only Memory) 4001 and ROM (Read Only Memory) 4002 EEPROM 4001 has memory region 42 for storing a specific code (later described), and memory region 50 storing the ID code assigned to pager 70. ROM 402 stores the programs which logic unit 41 will execute. Logic unit 41 collates the ID code inserted in the paging signal received by radio circuit 2 and demodulated by demodulator 3, with the ID code stored in memory region 50. If these ID codes are identical, logic unit 41 causes driver circuit 6 to drive speaker 7, whereby speaker 7 generates an alarm. If a message has been received, display 80 is driven, thereby displaying this message. If the ID codes are not identical, and pager 70 has been set to ID-code writing mode by operating mode-setting switch 90, logic unit 41 collates the specific code stored in memory region 42 with the code included in the paging signal. If these codes are identical, logic unit 41 writes the new ID code inserted in the paging word received after the paging word containing the specific code, into memory region 50. The new ID code is written over the ID code, if any, stored in memory region 50.

In order to write an ID code to pager 70 or to rewrite the ID code stored in pager 70 into a new one, pager 70 is located within a distance at which it can receive radio signals from ID code writer 60, preferably rather close thereto. The operator of writer 60 operates operation unit 14 of ID code writer 60, thereby inputting to code generator 10 a specific code and the ID code to be stored into pager 70 or to replace that one stored in memory region 50'. Then, the operator 50 turns on the transmission button 13 of writer 60, code transmitter 11 transmits a paging signal containing the new ID code the specific ID code through antenna 12.

Figure 4:
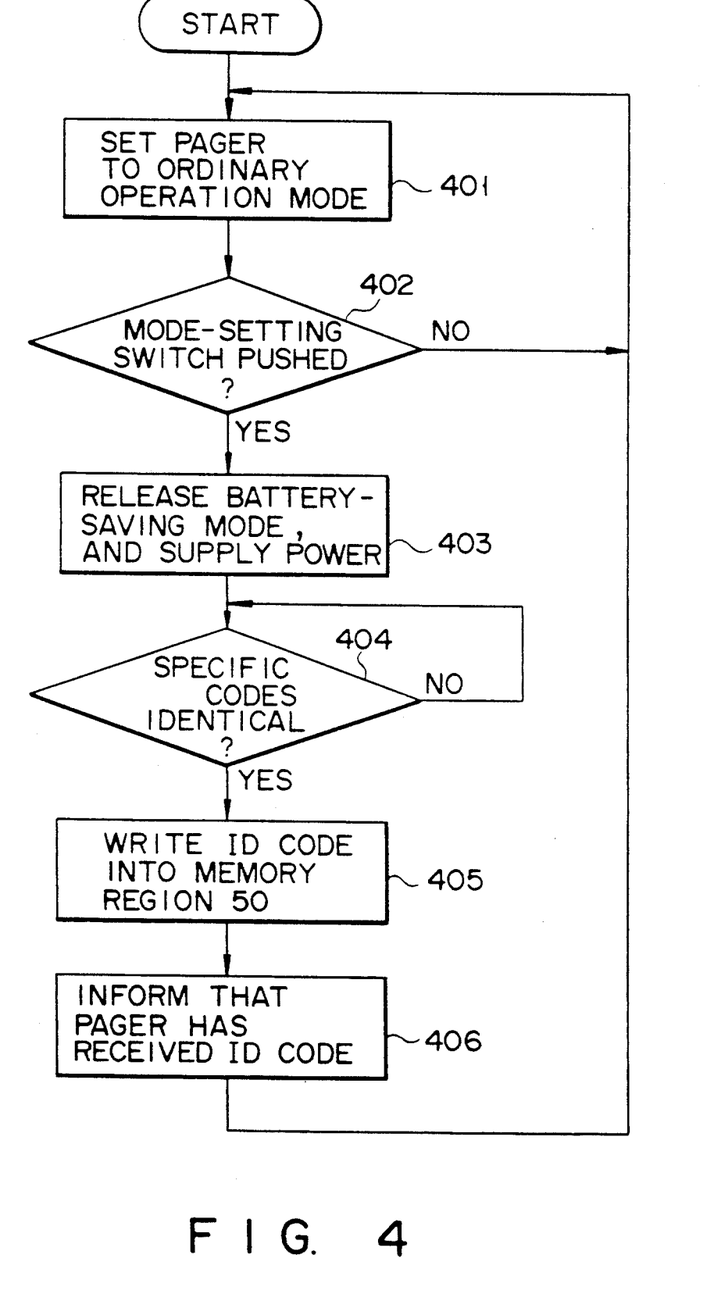
FIG. 4 is a flow chart explaining the operation of the pager illustrated in FIG. 3.

In pager 70, logic unit 41 operates as is shown in the flow chart of FIG. 4. First, logic unit 41 sets the other components of pager 70 into operation (step 401). Then, logic unit 41 determines whether or not mode-setting switch 90 has been depressed (step 402). If YES, pager 70 is set to ID-code writing mode, and logic unit 41 releases the other components from battery-saving condition, thus causing the power-source unit to supply power to the other components continuously (step 403). When the paging signal transmitted from ID code writer 60 reaches pager 70, radio circuit 2 detects the signal, and demodulation circuit 3 demodulates the signal. The specific ID code and the ID code, both inserted in this paging signal, are supplied to logic unit 41 of control circuit 40, and logic unit 41 collates the specific code with the specific code stored in memory region 42 (step 404). If YES, logic unit 41 writes the ID code, which pager 70 has received after the specific code, into memory region 50 (step 405). Then, logic unit 41 supplies a drive signal to driver circuit 6, thereby causing speaker 7 to generate a beep sound for a predetermined period of, for example, one second, or cause display 80 to display the message of, for example, "ID CODE OBTAINED" (step 406).

Since the ID code stored in memory region 50 is rewritten in accordance with the specific ID code inserted in the paging signal supplied from code rewriter 60 to pager 70, it is unnecessary to remove the memory having memory region 50 from pager 70 to rewrite ID code assigned to paper 70. The user of pager 70 need not open the case of pager 70, draw the memory, insert this memory into an external ROM, pull the memory from the ROM writer, insert the memory back into pager 70, or close the case of pager 70. Thus, the ID code assigned to pager 70 may be transferred within a short time. Further, since, the ID code is stored in the memory region provided within the microprocessor, a memory device such as a ROM need not be provided for storing the ID code. Pager 70 can, therefore, be smaller than otherwise.

Figure 6:
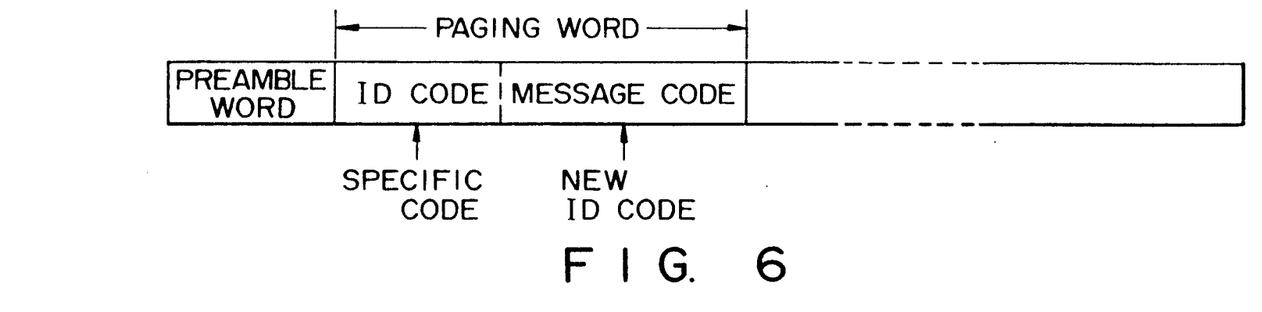
FIG. 6 is a schematically illustrating another paging signal transmitted to the pager (FIG. 3), which contains a specific code and a new ID code.

The present invention is not limited to the first embodiment described above. For instance, a display 80 can be connected to logic unit 41 as is shown in FIG. 3 and as in the conventional pager illustrated in FIG. 2. If this is the case, it suffices to insert a specific code and a new ID code in the ID code section and message section of a paging word, respectively as is illustrated in FIG. 6, and to transmit the paging signal having this paging word from code writer 60 to pager 70.

Further, the ID code stored in memory region 50 can be rewritten, without operating mode-setting switch 90 to set pager 70 to the ID-code writing mode. For instance, both code writer 60 and pager 70 can be placed within a shielded space SS such as a room shielded from radio signals, for example, as shown in FIG. 3. In this case, the ID code transmitted from code writer 60 is readily detected by pager 70 and written into memory region 50 even if pager 70 is not set to the ID-code writing mode.

Still further, the present invention can be applied to a pager which stores an ID code assigned to a group of paging words, so that the battery saving can be achieved for the group of paging words.

Furthermore, various modifications can be made within the scope of the first embodiment described above.

As has been described, in the pager which is the first embodiment of the invention, the ID code received after a specific code is written in the memory region provided within the control circuit if the code within the received signals is identical with the specific code stored in memory region 42 provided also in the control circuit. Hence, the ID code can be transferred, without necessity of removing the memory device for storing the ID code, from the pager. This enhances the efficiency of writing the ID code. Further, since the memory device need not be removed from the pager, it can be a flat and small one. This helps to miniaturize the pager.

Base station 600 used in a paging system, which is a second embodiment of the present invention will now be described, with reference to FIG. 7.

Figure 7:
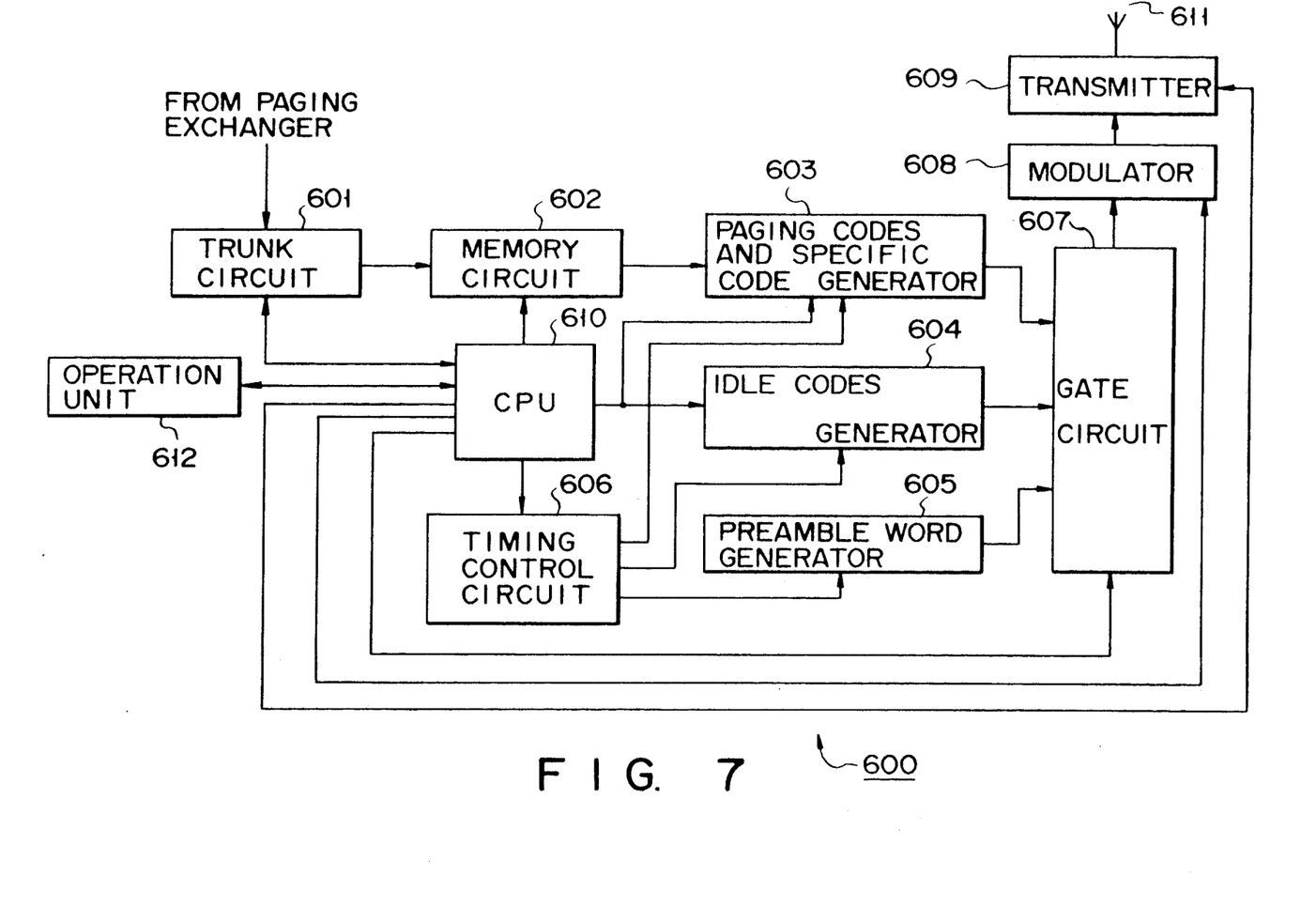
FIG. 7 is a block diagram of a base station used in a paging system, which is a second embodiment of the present invention.

As is shown in FIG. 7, base station 600 comprises trunk circuit 601, memory circuit 602. ID code/specific code generator 603, idle code ID code generator 604, and preamble word generator 605. Trunk circuit 601 receives paging requests which have been supplied from a paging telephone exchange and each of which contains the number assigned to a desired pager, and supplies the data representing the numbers of the desired pagers to the memory circuit 602. Memory circuit 602 stores the ID codes supplied from the trunk circuit 601. Generator 603 generates ID codes corresponding to the numbers of the pagers or specific codes and ID codes to be transferred, and their check bits. Idle code generator 604 generates idle codes indicative of vacancy of paging words. Preamble word generator 605 generates preamble words including sync signals and group-designating signals.

Base station 600 further comprises timing control circuit 606, gate circuit 607, modulator 608, transmitter 609, CPU (Central Processing Unit) 610, and operation section 612. Timing control circuit 606 supplies timing signals to ID code/specific code generator 603. Gate circuit 607 selectively outputs the signals generated by ID code/specific code generator 603, idle code generator 604, or preamble word generator 605. Modulator 608 modulates the signals output from gate circuit 607, thereby superposing these signals on radio carriers. Transmitter 609 transmits the signals on the radio carriers. CPU 610 is coupled to operation section 610, and controls the overall operation of the base station 600.

CPU 610 determines whether or not memory circuit 602 stores the numbers assigned to the desired pagers of a particular group, in order to broadcast the ID codes assigned to the pagers of this group. If memory circuit 602 stores the number of at least one pager which is to be paged is stored, CPU 610 controls all other components of base station 600 so that the ID codes representing the numbers assigned to the pager is broadcast from base station 600. In this embodiment, the ID code corresponding to each paging request is broadcast five times.

An ID-code writing command is supplied to CPU 610 from operation section 612 or from the external paging exchanger through trunk circuit 601. In response to this command, CPU 610 controls ID code/specific code generator 603, such that generator 603 generates a specific code with an ID code, which is designated at operation unit 612 or via trunk circuit 601. These signals are supplied to gate circuit 607. Gate circuit 607 selectively supplies these codes to modulator 608 under the control of CPU 610. Modulator 608 modulates the codes, also under the control of CPU 610. Transmitter 609 broadcasts these codes on radio carriers over channel 611, under the control of CPU 610.

Figure 8:
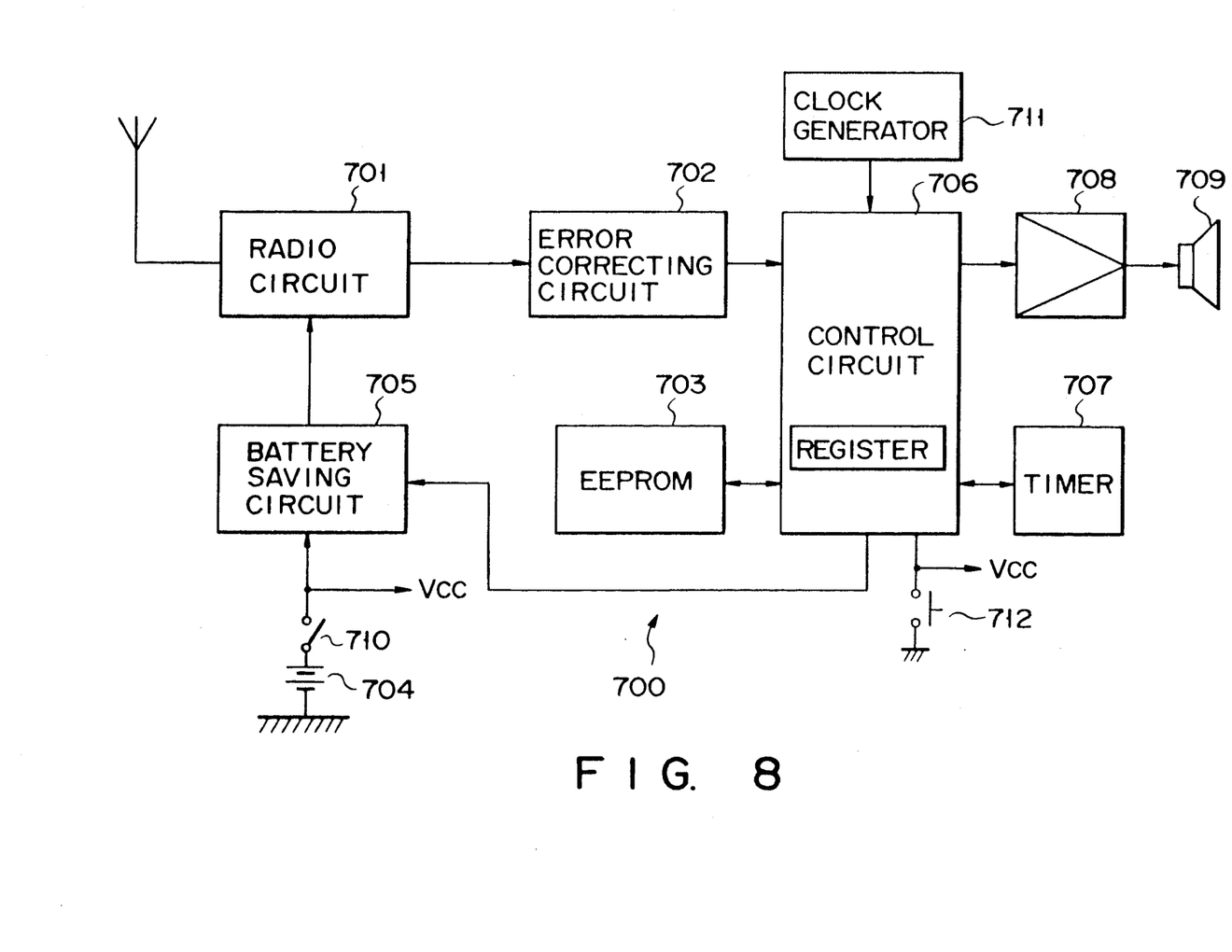
FIG. 8 is a block diagram illustrating another pager, which is a third embodiment of the invention.

FIG. 8 is a block diagram illustrating pager 700 which is the second embodiment of the present invention. As is shown in this figure, pager 700 comprises radio circuit 701, error correcting circuit 702, electrically erasable, programmable read-only memory (EEPROM) 703, battery 704, battery saving circuit 705, control circuit 706, timer 707, amplifier 708, speaker 709, a switch 710, and clock generator 711.

Radio circuit 701 is used to receive a paging signal broadcast from base station 600 (FIG. 7) over channel 611. Error correcting circuit 702 is designed to correct error bits, if any among the data bits of any paging word contained in the paging signal, in accordance with the check bits of the paging word. EEPROM 703 stores the ID code assigned to pager 700 and other data. Battery 704 is provided for supplying power to all other components of pager 700. Battery saving circuit 705 is designed to supply power from battery 704 to radio circuit 701 in response to the control signal supplied from control circuit 706. Control circuit 706 checks the paging words received by radio circuit 701 and processed by error correcting circuit 702, and generates an alarm signal and a control signal. Clock generator 711 supplies clock signals to control circuit 706. Amplifier 708 amplifies the alarm signal output by control circuit 706. Speaker 709 gives forth an alarm. i.e., a beep tone, in response to the amplified alarm signal. Switch 712 is operated to set pager 700 to the ID-code writing mode.

Figure 9:
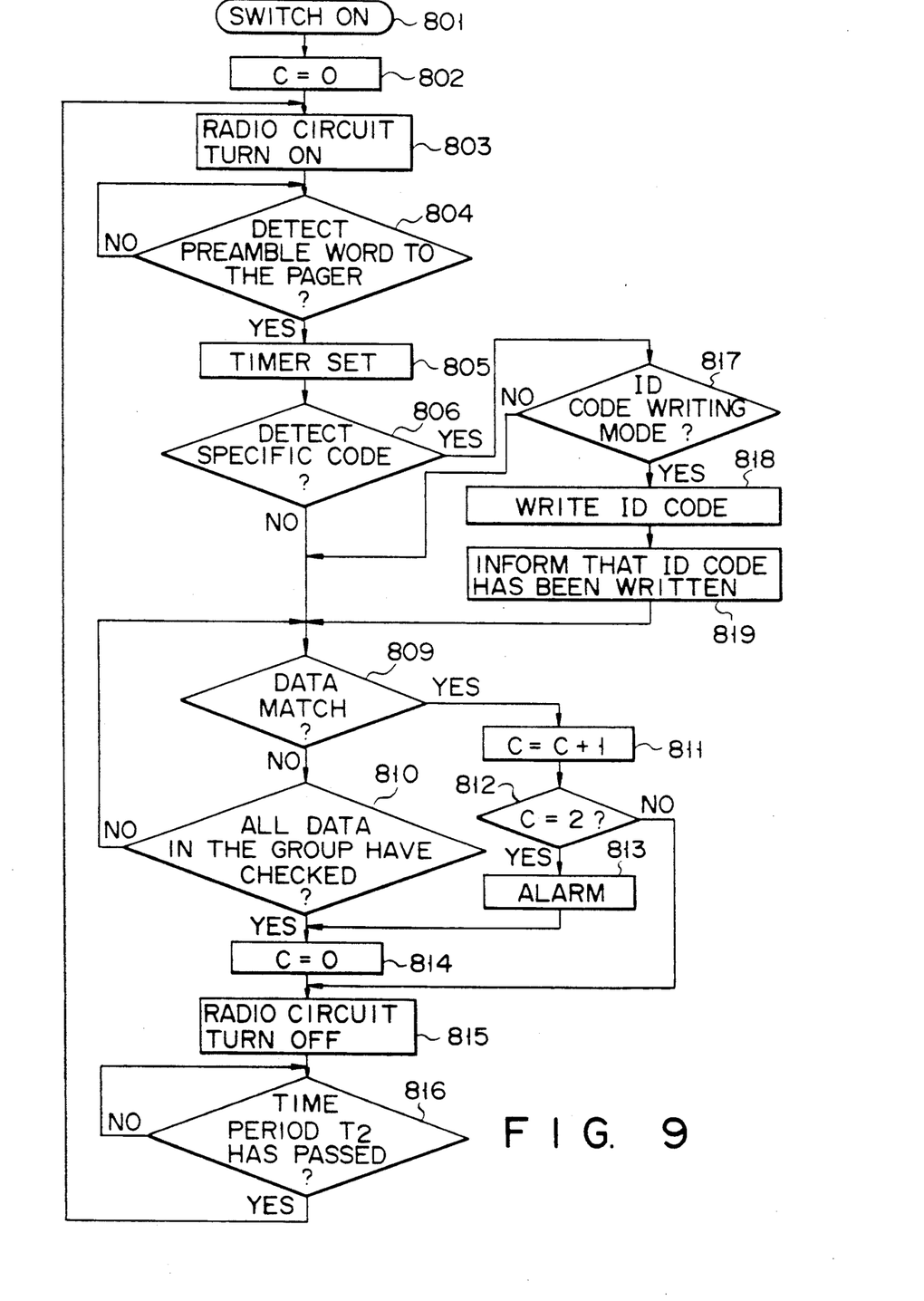
FIG. 9 is a flow chart explaining the operation of the pager illustrated in FIG. 8.

The operation of pager 700 will now be explained, with reference to the flow chart of FIG. 9. The algorithm corresponding to the flow chart is stored in EEPROM 703. Nonetheless, the algorithm can be stored in a memory (not shown) incorporated in control circuit 706.

First, switch 710 is turned on (step 801). Power is supplied from battery 704 to all components of pager 700, except radio circuit 701. The count value C stored in the register incorporated in control circuit 706 is set to zero (step 802). The count value C represents the number of preamble words which pager 700 has received. Control circuit 706 supplies a control signal to battery saving circuit 705, thus controlling circuit 705 such that power is supplied from battery 705 to radio circuit 701 (step 803). Radio circuit 701 detects a sync signal. Control circuit 706 determines whether or not the group-designating signal, which follows the sync signal, designates the group to which pager 700 belongs. Thus, a preamble word consisting of sync signals and a group-designating signal is detected (step 804) when the group number specified by the received group-designating signal is identical with one of the group numbers stored in EEPROM 703.

In response to the preamble word, thus detected, control circuit 706 sets timer 707 to zero (step 805). Control circuit 706 also checks the first paging word supplied from radio circuit 701 via error correcting circuit 702. Error correcting circuit 702 corrects erroneous data bits contained in the paging word, in accordance with the check bits contained also in the paging word. The corrected data bits are supplied to control circuit 706. Control circuit 706 compares the data bits of the paging word with the specific code read from EEPROM 703, thereby determining whether or not the paging word comprises a specific code (step 806).

If the paging word is found to comprise a specific code, control circuit 706 determines whether or not switch 712 has been operated (step 817), that is, whether or not pager 700 has been set to the ID-code writing mode. If NO, the operation goes to step 809. If YES, circuit 706 writes the new ID code, which is subsequently received after the specific code is received, into EEPROM 703 (step 818). Then, control circuit 706 drives speaker 7 or display 80, thereby informing the user that the ID code has been transferred to pager 700 (step 819), as in the first embodiment (FIG. 3).

If the paging word is found, in step 806, to comprise no specific codes, control circuit 706 compares the data bits of the received paging words with the ID code now stored in EEPROM 703, thereby determining whether or not the received paging words includes one addressed to pager 700 (steps 808 and 809). If the received paging words includes one addressed to pager 700, that is, if one of the received paging words contains an ID code identical with the ID code stored in EEPROM 703, control circuit 706 increments the count value C stored in the register, by one (step 811). Then, control circuit 706 determines whether the count value C is 2 or not (step 812). If YES, control circuit 706 generates an alarm signal for a predetermined period of time. This alarm signal is amplified by amplifier 708 and supplied to speaker 709. Speaker 709 gives forth a beep tone in response to the alarm signal (step 813). Then, control circuit 706 resets the count value C to zero (step 814), and supplies a control signal to battery saving circuit 705, whereby circuit 705 stops supplying power from battery 704 to radio circuit 701 (step 815). If NO in step 812, that is, if the count value C is not 2, the operation jumps to step 815, skipping step 813 and step 814. When the paging word addressed to pager 700 is detected, the operation goes to step 815, with no other received paging words checked by control circuit 706. Therefore, power which would have been consumed for checking the other paging words can be saved.

If none of the received paging words is addressed to pager 700, the operation goes to step 814, in which the count value C is reset to zero. Then, in step 815, power saving circuit 705 stops supplying power to radio circuit 701. In the next step, i.e., step 816, control circuit 706 determines whether or not the count of timer 707 has reached a predetermined value corresponding to a period T1 of time approximately equal to the length of one frame containing no group signals. If YES, that is, if the period T1 has passed, the operation returns to step 803.

Also with this embodiment, the time required for writing an ID code is very short, and the efficiency of writing the ID code is therefore high. Further, since EEPROM 703 need not be removed from pager 700, it can be secured to the circuit board of pager 700 by means of, for example, soldering. Therefore, the EEPROM package can be changed from DIP type to a flat, thin one. In addition, pager 700 requires no receptacle for detachably holding EEPROM 703. These features help to miniaturize paper 700. To rewrite the ID code stored in EEPROM 703, no switches need to be operated to set pager 700 to the ID-code writing mode. It suffices for the base station to transmit first a specific code and then a new ID code, and for the control circuit 706 of pager 700 to determine whether or not the message code addressed to pager 700 contains the specific code, and to replace the old ID code with the new ID code received after the specific code.

Figure 10:
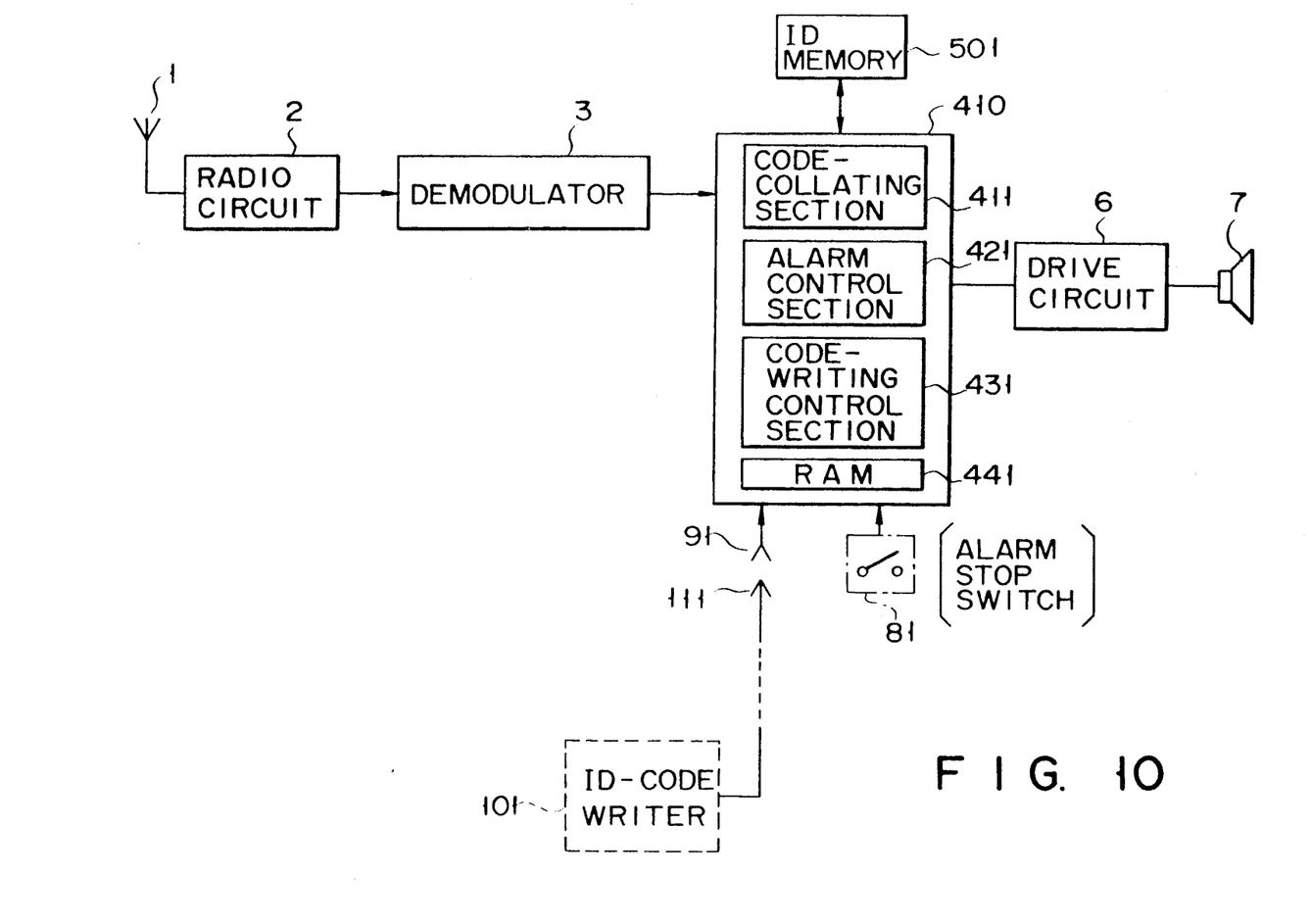
FIG. 10 is a block diagram showing a further pager, which is a fourth embodiment of the present invention.

FIG. 10 is a block diagram illustrating a pager which is a third embodiment of the present invention. The same components as those of the first embodiment shown in FIG. 3 are designated by the same numerals in FIG. 10.

As is shown in FIG. 10, this pager comprises antenna 1, radio circuit 2, demodulation circuit 3, drive circuit 6, and speaker 7, like the pager illustrated in FIG. 3. The pager further comprises alarm stop switch 81, control circuit 410, and ID memory 501 (e.g., EEPROM). Circuit 410 has a microcomputer, input terminal code-collating section 411, alarm control section 421, code-writing control section 431, and a RAM, via input terminal 91, an ID code can be written into ID memory 501 from an external ID-code writer 101. Code-collating section 411 is designed to collate the ID code received from ID-code rewriter with the ID code stored in ID memory 501 and assigned to the pager. Alarm control section 421 is used to supply an alarm signal to drive circuit 6, thereby to cause speaker 7 to generate an alarm, when the received ID code is found to be identical with the ID code stored in ID memory 501. Code-writing control section 431 is connected to input terminal 91, which in turn can be coupled to the output terminal 111 of external ID-code writer 101. When alarm stop switch 81, which is usually off, thereby preventing speaker 7 from generating an alarm, is turned on, code-writing control section 410 is set to a code-writing mode, thereby to control the writing of an ID code into ID memory 501. At the same time, alarm control section 421 supplies an alarm signal to drive circuit 6, whereby speaker 7 generates an alarm, informing the user that section 410 has been set to the code-writing mode.

Figure 11:
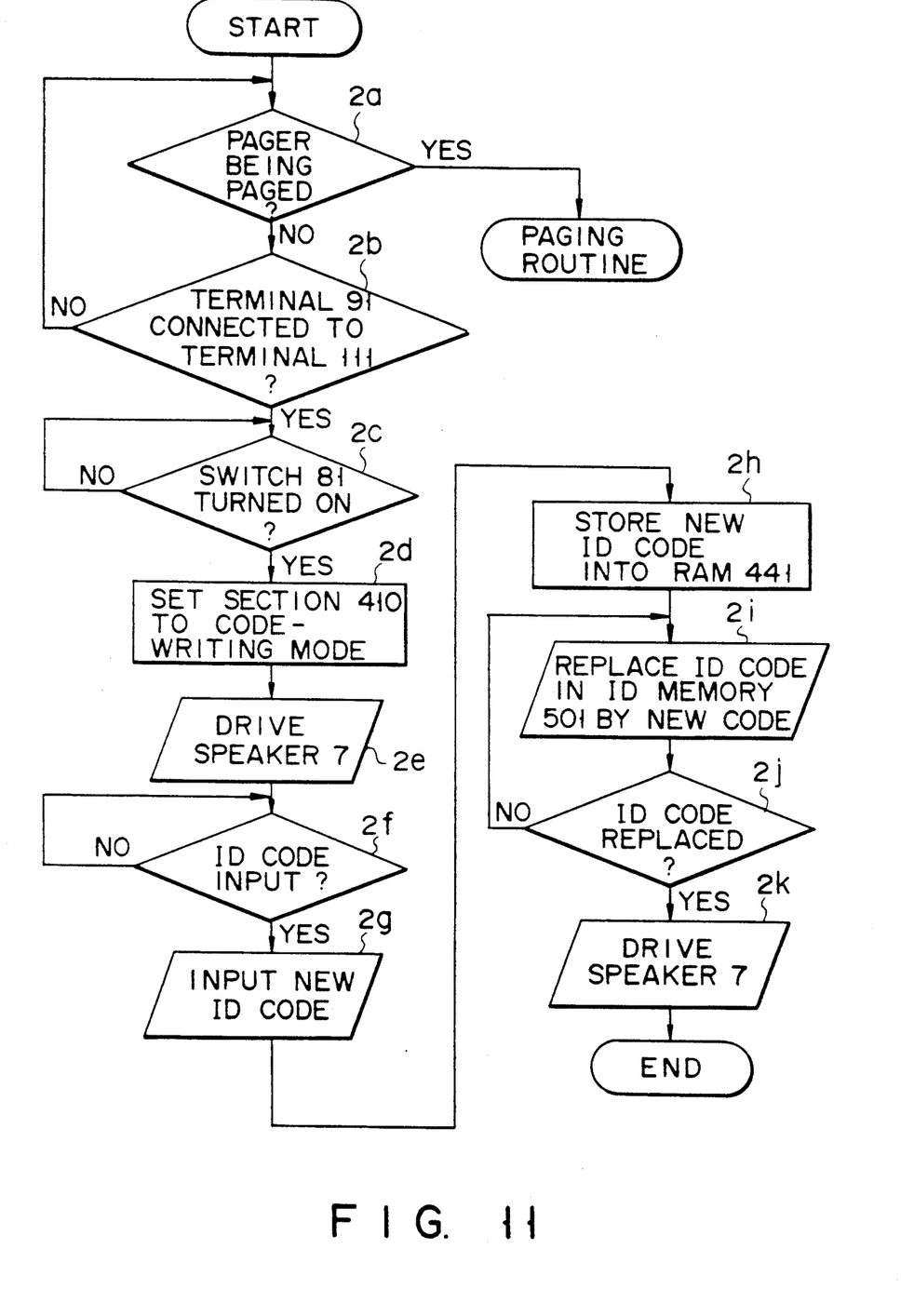
FIG. 11 is a flow chart explaining the operation of the control circuit incorporated in the pager shown in FIG. 9.

The operation of the pager, described above, will be explained with reference to the flow chart of FIG. 11. First, control circuit 410 determines whether or not the pager has been paged (step 2a). If NO, control section 410 determines whether or not input terminal 81 is connected to external code-writer 101 (step 2b). Steps 2a and 2b are repeated until code-collating section 411 finds that the received ID code is identical with that stored in ID memory 501. Then, control section 410 determines that the pager is being paged, and alarm control section 421 comes into operation.

When the pager changes hands, the ID code stored in ID memory 501 needs to be rewritten. To rewrite the ID code, the input terminal 91 of the pager is connected to the output terminal 111 of external ID-code writer 101. Thus, control circuit 410 determines in step 2b that terminal 91 is coupled to terminal 111. Then, the operation goes to step 2c, in which control section 410 determines whether or not alarm stop switch 81 has been turned on. If YES, that is, if the operator has turned on alarm stop switch 81 after connecting terminal 91 to the output terminal 111 of external code-writer 101, control circuit 410 is set to the code-writing mode (step 2d). In the next step, i.e., step 2e, alarm control section 421 supplied an alarm signal to driver circuit 6, causing speaker 7 to generate an alarm. Hearing this alarm, the operator knows that control circuit 410 has been set to the code-writing mode.

In step 2f, control circuit 410 determines whether or not an ID code has been input by operating external ID-code writer 101. If NO, that is, if the operator has not input an ID code, step 2f is repeated. If YES, that is, if the operator has input an ID code, this ID code is supplied form ID-code writer 101 to the pager in step 2g. In step 2h, the ID code is temporarily stored in RAM 441. Then, the step 2i, the ID code stored in ID memory 501 is replaced by the ID code stored in RAM 441. In the next step, i.e., step 2j, it is determined whether or not the new ID code output from ID-code writer 101 has been written into ID memory 501. If NO, step 2i is repeated until the new ID code is written into ID memory 501. If YES, the operation goes to step 2k, in which alarm control section 421 supplies an alarm signal to drive circuit 6, thereby causing speaker 7 to give an alarm. Hearing this alarm, the operator knows that the new ID code has been written into ID memory 501, replacing the old IC code.

As has been described, the ID code stored in ID memory 501 (i.e., EEPROM) can be replaced by an ID code input from the external ID-code writer 101 through input terminal 91, by means of code-writing control section 421. Therefore, ID memory 501 need not be detached from the pager in order to replace the ID code with a new one. It can be secured to the printed circuit board incorporated in the pager, by means of, for example, soldering, and can, therefore, be a small ROM. In addition, the pager requires no receptacle for holding ID memory 501 detachably. As a result, the pager can be small enough to be put into a pocket. Furthermore, since the pager gives an alarm when control circuit 410 is set to the code-writing mode, the operator can know for sure that circuit 410 has been set to this operation mode. This increases the efficiency of changing the ID code of the pager. Still further, since this alarm is generated by speaker 7 used for giving an alarm informing the user that the pager is being addressed, the pager requires no other speakers. Moreover, since alarm stop switch 81 is operated also for setting control circuit 410 to the code-writing mode, a switch need not e provided for setting circuit 410 to this operation mode.

The third embodiment illustrated in FIG. 10 can be modified. For example, a visual alarm device such as a light-emitting diode can be used in addition to speaker 7. In this case, the visual alarm is flashed repeatedly, informing the operator that control circuit 410 has been set to the code-writing mode. Alternatively, a message display can be used in addition to speaker 7, for displaying the message informing the operator that circuit 410 has been set to the code-writing mode, in which case, the switch of the message display can be used to set control circuit 410 to the code-writing mode, instead of alarm stop switch 81. Further, the structure of control circuit 410, the function thereof, the means for informing the operator of the setting of the code-writing mode, the ID memory, and the like can be modified or altered, no departing the scope of the third embodiment.

As has been detailed above, in the pager according to the fourth embodiment of the invention, ID memory 501, which is a programmable memory and storing the ID code assigned to the pager, is secured within the pager, control circuit 410 is set to the code-writing mode when code-writing section 431 is connected to external code writer 101 by input terminal 91 and alarm stop switch 81 is turned on, and speaker 7 gives forth an alarm, thus informing the user that circuit 410 has been set to the code-writing mode. Since ID memory 501 need not be detached from the pager to replace the ID code with a new ID code input by operating external code writer 101, nor does the pager require a receptacle for holding ID memory 501 detachably, the pager is small, and the ID code can easily be replaced with the new one.

Figure 12:
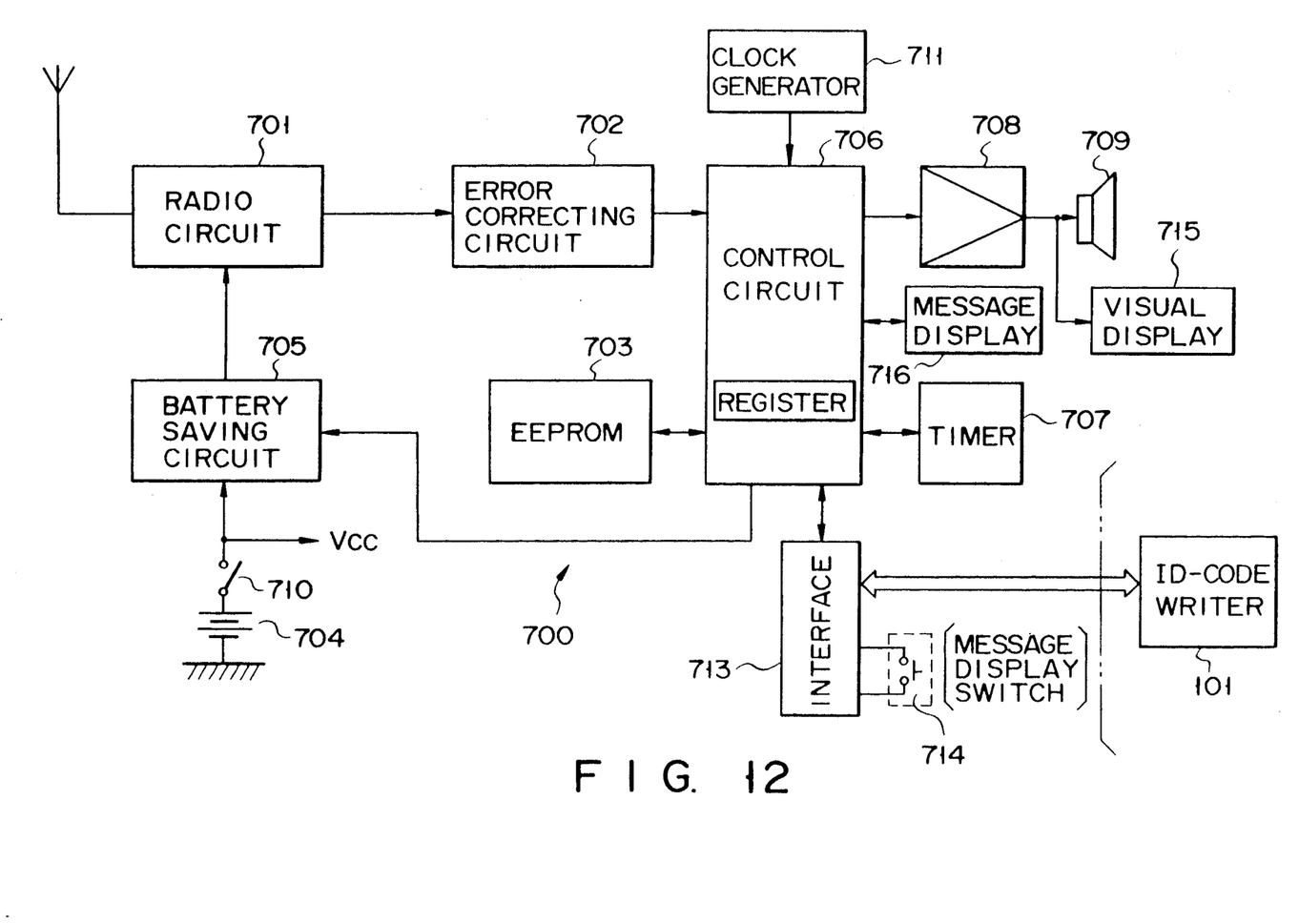
FIG. 12 is a block diagram illustrating still another pager, which is a fifth embodiment of this invention.

FIG. 12 is a block diagram showing a modification of the third embodiment, i.e., the pager shown in FIG. 10, and is a forth embodiment of the present invention. The same components as those of the forth embodiment shown in FIG. 12 are designated by the same numerals in FIG. 8.

As can be understood from FIG. 12, this pager is different from the third embodiment (FIG. 10) on several points. First, control circuit 706 can be connected by interface 713 to external writing device such as a code writer 101. Second, control circuit 706 is a single-chip microprocessor having a logic unit, a ROM, and a EEPROM, and the EEPROM stores the ID code assigned to the pager, not in an individually mounted ID memory device as in the third embodiment (FIG. 10). Third, control circuit 706 is set to a code-writing mode when message display switch 714 is turned on. Fourth, visual display 715 and message display 716 are connected to amplifier 708 and control circuit 706, respectively. When circuit 706 is set to the code-writing mode, the display 715 repeatedly flashes, and display 716 display a message, thus informing the user that control circuit 706 has been set to the code-writing mode. When interface 713 remains disconnected from code writer 101, the same sequence of operations as is shown in FIG. 9, except for steps 817, 818, and 819, is performed so that the pager is addressed. On the other hand, when interface 173 is connected to code writer 101, and message display switch 714 is turned on, the same sequence of operations as is shown in FIG. 11, except for step 2i, is carried out, thereby writing a new ID code into the EEPROM of control circuit 706.

While the ID code is transferred to a pager from an external writing device responsive to an actuation of a switch such as an alarm stop switch or a message display switch, it may be transferred upon a completion of connection between the pager and the external writing device or responsive to an actuation of a switch provided at the external writing device.

What is claimed is:

1. A radio telecommunication system for writing an identification number for paging, said system comprising:
    means for providing a shielded space, wherein radio signals are not interfered with by radio signal originating outside from said shielded space;
    writer means provided within said shielded space, for transmitting a specified code and a new ID code on a radio channel; and
    a paging apparatus provided within said shielded space, said paging apparatus comprising:
    (a) means for receiving radio signals transmitted over radio channel from the writer means;
    (b) means for detecting the specific code within the received radio signals; and
    (c) means for storing the ID code received in association with the detected specific code as the identification number, wherein the paging apparatus can write the ID code by the normal operation without setting an ID writing mode.

2. The radio telecommunication system according to claim 1, wherein the writer means includes a code generator and a code transmitter.

3. The radio telecommunication system according to claim 2, wherein the code generator includes a ROM writer for outputting the specific code and a new ID code.

4. The radio telecommunication system according to claim 1, wherein the receiving means comprises:
    an antenna for receiving the radio signals;
    a radio circuit for extracting a signal having a predetermined frequency from the radio signals received by the antenna; and
    means for demodulating the signal extracted by the radio circuit, and for synchronizing the signal.

5. The radio telecommunication system according to claim 1, wherein the detecting means comprises:
    storage means having a first memory region where the specific code extracting the ID code writing for checking is stored;
    a second memory region storing the ID code; and
    means for checking the radio signals received by the receiving means with the specific code stored in the first memory region, and for writing the ID code to be received in association with a specific code corresponding to the specific codes stored in the radio signals if it is checked that such a specific code exists.

* * * * *